United States Patent [19]

Malone et al.

[11] 4,290,899
[45] Sep. 22, 1981

[54] THERMAL STABILIZER FOR NON-CLAY WELLBORE FLUIDS

[75] Inventors: Thomas R. Malone, Charleston, WV; Talmage D. Foster, Jr., deceased, late of St. Albans, W. Va.; Sue T. Foster, executrix, Senaca, S.C.

[73] Assignee: Union Carbide Corporation, New York, N.Y.

[21] Appl. No.: 885

[22] Filed: Jan. 4, 1979

[51] Int. Cl.³ .............................................. C09K 7/02
[52] U.S. Cl. .............................. 252/8.5 A; 252/8.55 R
[58] Field of Search .............. 252/8.5 A, 8.5 B, 8.5 C, 252/8.55 R

[56] References Cited

U.S. PATENT DOCUMENTS

| | | | |
|---|---|---|---|
| 3,046,221 | 7/1962 | Dodd | 252/8.5 |
| 3,093,603 | 6/1963 | Gilchrist | 260/17 |
| 3,709,876 | 1/1973 | Glomski et al. | 106/170 X |
| 3,769,247 | 10/1973 | Glomski et al. | 260/17 |
| 3,852,201 | 12/1974 | Jackson | 252/8.5 |
| 3,872,018 | 3/1975 | Alexander | 252/8.5 |
| 3,878,110 | 4/1975 | Miller et al. | 252/8.5 |
| 3,953,335 | 4/1976 | Jackson | 252/8.5 |
| 3,988,246 | 10/1976 | Hartfiel | 252/8.5 |
| 3,993,570 | 11/1976 | Jackson et al. | 252/8.5 |
| 4,025,443 | 5/1977 | Jackson | 252/8.5 |

Primary Examiner—Herbert B. Guynn
Attorney, Agent, or Firm—Bernard Francis Crowe

[57] ABSTRACT

Calcined dolomite stabilizes aqueous solutions of viscosifiers, such as polysaccharides, exposed to temperatures as high as 200° F. (93° C.) for prolonged periods.

10 Claims, No Drawings

THERMAL STABILIZER FOR NON-CLAY WELLBORE FLUIDS

BACKGROUND OF THE INVENTION

This invention pertains to improved thermal stabilizers for non-clay wellbore fluids and more particularly to the use of viscosifiers, such as polysaccharides treated with calcined dolomite.

In the search for new sources of oil and gas, wells are drilled to greater depths than ever before thought possible. As greater depths are reached, higher formation temperatures are encountered. The low solids polymer drilling muds and completion and work-over fluids used in these applications cannot withstand these higher temperatures.

Currently several different polymers are used as viscosifiers (i.e., materials which increase the viscosity of aqueous solutions) in these applications, although all polymers are not used in each application, with the preferred polymers being polysaccharides of which the cellulosic type and more specifically hydroxyethyl cellulose (HEC) is particularly preferred. These polymers are excellent viscosifiers in reasonably low concentrations and cause little or no formation damage. Other polymers used in these applications include hydroxyalkylated guar gum derived from the guar plant (Cyamopsis tetragonolobus) and xanthan gum, a polysaccaride produced through fermentation by the microorganism Xanthomonas campestris. These polymers exhibit somewhat the same properties as HEC but are not acceptable in all phases of drilling, completions and workovers due to possible formation damage. Formation damage as described herein refers to the plugging of the pores of the producing formation in such a manner that oil or gas flow is impaired and recovery from the damage is often difficult or impossible.

Thermal stability is defined herein as the ability of an aqueous polymer solution, stabilized or unstabilized, to retain as much as possible of its original solution viscosity after exposure for 72 hours to a temperature of 200° F. (93° C.) If an unstabilized sample is treated at 200° F. (93° C.) in either fresh water or brine (3.5% NaCl) for 72 hours, its viscosity loss is generally in the 55-65 percent range.

Therefore an object of this invention is to improve the operating capability of polysaccharides, such as, hydroxyethyl cellulose so as to increase their thermal stability.

Other objects will become apparent to those skilled in the art upon a reading of the specification.

The current state of the art involves the use of magnesium oxide (magnesia) disclosed in U.S. Pat. No. 3,953,335. In this patent, it is specified that the amount of magnesia based on the polymer weight, which is required to stabilize the polymer, is about 15 percent.

SUMMARY OF THE INVENTION

The objects of this invention have been achieved by adding to an aqueous polysaccharide solution used in oil or gas well drilling, workover and completion fluids about 0.5 to about 13% of calcined dolomite, based on the weight of polysaccharide in said aqueous solution.

Dolomite, or as it is sometimes called, dolomitic limestone, has a magnesium content of about 13 percent present in the form of magnesium carbonate. The remainder is mainly calcium with about 22 percent present as calcium carbonate. Dolomite, when added to water-soluble polysaccharides used in drilling, workover and completion fluids imparts little or no improvement in the thermal stability of the polysaccharides. The primary purpose of dolomite, when used in this form, is fluid loss control. It is only after calcining, as for example, by heating the dolomite to about 900° C. for about 6 hours that it imparts thermal stability to the polysaccharide. While not wishing to limit the invention to any theory or scientific explanation, it is believed that after calcining, which raises the content of MgO in the treated dolomite to a level of about 41.7%, a synergistic effect is produced due to the fortuitous combination of MgO and CaO produced. This effect is markedly superior to that achieved by adding MgO alone to the water-soluble polysaccharide. This effect is unexpected because calcium oxide alone when added to a water-soluble polysaccharide has a deleterious effect on its thermal stability.

The preferred polysaccharide is hydroxyethyl cellulose at a concentration of about 0.5 to about 5% of calcined dolomite based on the weight of hydroxyethyl cellulose present as well as other hydroxyalkyl celluloses containing 2 to 4 carbons in the alkyl group.

The initial pH of an aqueous polysaccharide solution containing 200 parts per million (ppm) of calcined dolomite, which is about 10.7, falls off to about 9.5 after exposure to a temperature of 200° F. (93° C.) for 72 hours. The reserve alkalinity of this material is desirable because it effects the absorption of any free acid which might be in the system due to the manufacturing method used to prepare the polysaccharides or due to acids generated by the partial decomposition of the polysaccharide if any such decomposition should occur. The alkalinity of the additive used is critical since a pH higher than 11 is undesirable because oxidative degradation of polysaccharides occur in this range. Calcium oxide, for example, is eliminated from consideration since it provides an initial pH of greater than 12.

The invention is further described in the Examples which follow. All parts and percentages are by weight unless otherwise specified.

EXPERIMENTAL PROCEDURE

All samples were prepared in fresh water (tap water) having a pH of 8.5, unless otherwise noted. When dolomite (calcined or uncalcined) was used it was added to the water first, using a Waring blender. This was mixed for about one minute, to insure dispersion, before the polymer (water-soluble polysaccharide) was added by sifting into the vortex. Mixing by blender was continued only long enough to insure dispersion of the polymer and prevent shear degradation. Mixing of the sample was then continued on a mechanical mixer for four hours before performing the initial evaluation. In the initial evaluation viscosity determinations were made using a MODEL 35 FANN VISCOMETER at 600 rpm.

The samples were then transferred to one pint pyrex pressure bottles which were maintained in a rotating bath containing hot water at 200° F. for 72 hours. At this time the samples were removed, cooled to room temperature, and the final solution viscosities determined. Loss of viscosity was calculated as follows:

$$\frac{\text{Original Visc. (cps)} - \text{Final Visc. (cps)} \times 100}{\text{Original Visc. (cps)}} =$$

The commerical calcined dolomite used in this study has several common trade names such as "Dead Burned Dolomite", "Dolomitic Quicklime", "Burnt Quicklime" and "Dolomitic Ground Lime".

The addition of salts as NaCl and $CaCl_2$ appeared to have no effect on the system, beneficial or otherwise. Calcined dolomite as such is completely soluble in hydrochloric acid, thereby eliminating the possibility of formation damage.

EXAMPLES 1–3

Using the Experimental Procedure described above, four aqueous solutions of Cellosize HEC QP-100 M (trademark of Union Carbide Corporation for hydroxyethyl cellulose having a molecular substitution, M.S., of 2.0 and a degree of substitution, D.S., of 0.9 to 1.0 and a number average molecular weight of about 1,000,000) were prepared, containing 2 lbs. of Cellosize per barrel of water and 0.874, 2.62 and 4.37% by weight respectively (based on the weight of Cellosize) of dolomite which had been calcined at 900° C. These concentrations of calcined dolomite correspond to 50, 150 and 250 parts by weight per million parts by weight of the total aqueous solution. The stabilizing effect was evaluated from the percent viscosity of the solution viscosity before heating which was retained after heating 72 hours at 200° F. (93° C.). The percent of the viscosity of these three solutions retained after 72 hours at 200° F. (93° C.), was 81, 100 and 99.7% respectively.

CONTROL A

Example 1 was repeated with the exception that 0.175% by weight (10 ppm) of calcined dolomite was used. The percent viscosity retained was 44.

EXAMPLE 4

Using the same Experimental Procedure as in Examples 1–3 with the exception that the aqueous solution of HEC contained 115 parts of magnesium oxide per million parts of solution, the retained viscosity was only 75% after 72 hours at 200° F. (93° C.). In contrast a solution containing 200 parts of calcined dolomite (containing only 83.6 parts of magnesium oxide) retained 93-98% of the original viscosity after 72 hours at 200° F. (93° C.).

EXAMPLE 5

Using the same Experimental Procedure as in Examples 1–3 with an aqueous solution containing 5700 parts of HEC per million of solution and 200 parts per million of a mixture of 58.2% by weight of calcium oxide and 41.8% by weight of magnesium oxide, the retained viscosity after 72 hours at 200° F. (93° C.) was 88%. A random sample of commercial Ground Burned Quicklime obtained from Ohio Lime Co. at a concentration of 200 parts by weight per million parts of the above-described HEC solution showed a retained viscosity of greater than 99% after 72 hours at 200° F. (93° C.).

CONTROL B

When uncalcined dolomite was used in the Experimental Procedure as in Examples 1–3 at a concentration of 1000 parts by weight per million parts of solution (17.5% based on the weight of HEC) little or no effect on thermal stability after 72 hours at 200° F. (93° C.) was noted. The retained viscosity in this case was only 69.8%.

CONTROL C

The procedure used in Examples 1–3 was repeated with the exception that 1000 parts per million (17.5% based on the weight of HEC) of calcined dolomite was used. The retained viscosity was 70.7%.

EXAMPLES 6–7

Using the Experimental Procedure as in Examples 1–3 with calcined dolomite at concentrations of 500 and 750 parts by weight per million parts of solution (which is equivalent to 8.75% and 13.1% based on the weight of HEC), the values of retained viscosity were 85.9% and 80.7% respectively. These data indicate that the stabilizing property of calcined dolomite diminishes above a concentration of about 250 ppm with HEC.

EXAMPLES 8–9

The Experimental Procedure used in Examples 1–3 was followed with the exception that polysaccharides from Xanthomonas campestris and hydroxyalkylated guar gum were used as viscosifiers at concentrations of 2 lbs/barrel of solution in place of the hydroxyethyl cellulose with 200 parts by weight of calcined dolomite per million parts of solution. The percent retained viscosity was 48.5% and 86.9% respectively. When the calcined dolomite was omitted the retained viscosity was only 21.3% and 75.8% respectively after 72 hours at 200° F. (93° C.).

EXAMPLES 10–11

The Experimental Procedure used in Examples 1–3 was followed with the exception that DRISCOSE (Drilling Specialties trade name for carboxymethyl cellulose or CMC) and carboxymethyl hydroxyethyl cellulose (CMHEC) were used as viscosifiers at concentrations of 3 and 2 lbs/barrel of solution respectively in fresh water. The percent retained viscosity was 30.3% and 31.7% respectively. When calcined dolomite was added at 200 ppm by weight of the total solution, the retained viscosities were 74.1% for the CMC and 73.8% for the CHHEC.

EXAMPLE 12

When Example 1 is repeated with the exception that hydroxyethyl carboxyethyl cellulose (HECEC) is substituted for the Cellosize, comparable results are obtained.

CONTROL D

Using the Experimental Procedure previously described a solution containing 5700 ppm HEC was prepared in fresh water. After 72 hours at 200° F. (93° C.) the retained viscosity of the sample was only 38 percent.

Although the invention has been described in its preferred forms with a certain degree of particularity, it is understood that the present disclosure has been made only by way of example, and that numerous changes can be made without departing from the spirit and scope of the invention.

What is claimed is:

1. In the method of drilling, workover or completion of oil and gas wells using an aqueous polysaccharide solution non-clay well bore fluid, said polysaccharide being a viscosifier and selected from the class consisting of hydroxyalkyl cellulose having 2 to 4 carbons in the alkyl, carboxymethyl hydroxyethyl cellulose, hydroxyalkylated guar gum, xanthan gum or hydroxyethyl carboxyethyl cellulose wherein said wellbore fluid is injected into the wells in contact with the formation, the improvement which comprises incorporating into said solution about 0.5 to about 13% by weight of calcined dolomite, based on the weight of polysaccharide.

2. Method claimed in claim 1 wherein the polysaccharide is an hydroxyalkyl cellulose having 2 to 4 carbons in the alkyl.

3. Method claimed in claim 2 wherein the hydroxyalkyl cellulose is hydroxyethyl cellulose.

4. Method claimed in claim 1 wherein the calcined dolomite contains at least about 40% by weight of MgO based on the weight of calcined dolomite.

5. Method claimed in claim 3 wherein the calcined dolomite is present at a concentration of about 0.5 to about 5.0% by weight based on the weight of hydroxyethyl cellulose.

6. Method claimed in claim 1 wherein the polysaccharide is carboxymethyl cellulose.

7. Method claimed in claim 1 wherein the polysaccharide is carboxymethyl hydroxyethyl cellulose.

8. Method claimed in claim 1 wherein the polysaccharide is hydroxyalkylated guar gum.

9. Method claimed in claim 1 wherein the polysaccharide is xanthan gum.

10. Method claimed in claim 1 wherein the polysaccharide is hydroxyethyl carboxyethyl cellulose.

* * * * *